(12) United States Patent
Tedman et al.

(10) Patent No.: US 9,517,692 B2
(45) Date of Patent: Dec. 13, 2016

(54) TANK WITH INVERTED SUMP

(71) Applicant: DEERE & COMPANY, Moline, IL (US)

(72) Inventors: Matthew P. Tedman, Sabetha, KS (US); Ashwani Verma, Pune (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/586,378

(22) Filed: Dec. 30, 2014

(65) Prior Publication Data

US 2016/0185213 A1  Jun. 30, 2016

(51) Int. Cl.
*B60K 15/03* (2006.01)
*B60K 15/07* (2006.01)

(52) U.S. Cl.
CPC ..... *B60K 15/07* (2013.01); *B60K 2015/03105* (2013.01)

(58) Field of Classification Search
CPC .................. B60K 15/07; B60K 2015/03105
See application file for complete search history.

(56) References Cited

U.S. PATENT DOCUMENTS

| | | | | |
|---|---|---|---|---|
| 4,179,036 A | * | 12/1979 | Pasini | B60K 15/077 137/574 |
| 4,354,521 A | * | 10/1982 | Harde | B60K 15/077 137/571 |
| 5,170,764 A | * | 12/1992 | Tuckey | F02M 37/106 123/509 |
| 6,314,995 B1 | * | 11/2001 | Meyer | B60K 15/077 123/509 |
| 7,089,917 B1 | * | 8/2006 | McKinster | B62J 37/00 123/509 |
| 7,234,451 B2 | * | 6/2007 | Betz, II | B60K 15/077 123/509 |
| 8,069,834 B2 | * | 12/2011 | Riedel | F01M 11/0004 123/195 C |

* cited by examiner

*Primary Examiner* — Anne Marie Boehler
*Assistant Examiner* — Marlon A Arce
(74) *Attorney, Agent, or Firm* — Lorenz & Kopf, LLP

(57) ABSTRACT

A liquid storage tank or a work vehicle requiring high ground clearance has an inverted sump within a tank volume defined between a tank floor and peripheral walls. In one configuration, the sump includes four sump walls of various configurations and extending at various heights within the tank volume. A flow passage is defined by the spacing between the various sump walls and a peripheral wall. The tank floor may have an inclined section, which in cooperation with the sump and a spanner wall, defines a supplemental inverted sump in communication with the flow passage. As a fuel tank, the sump is configured to store fuel within a sump volume sufficient to satisfy prescribed runtimes in various off-level conditions of the vehicle.

18 Claims, 6 Drawing Sheets

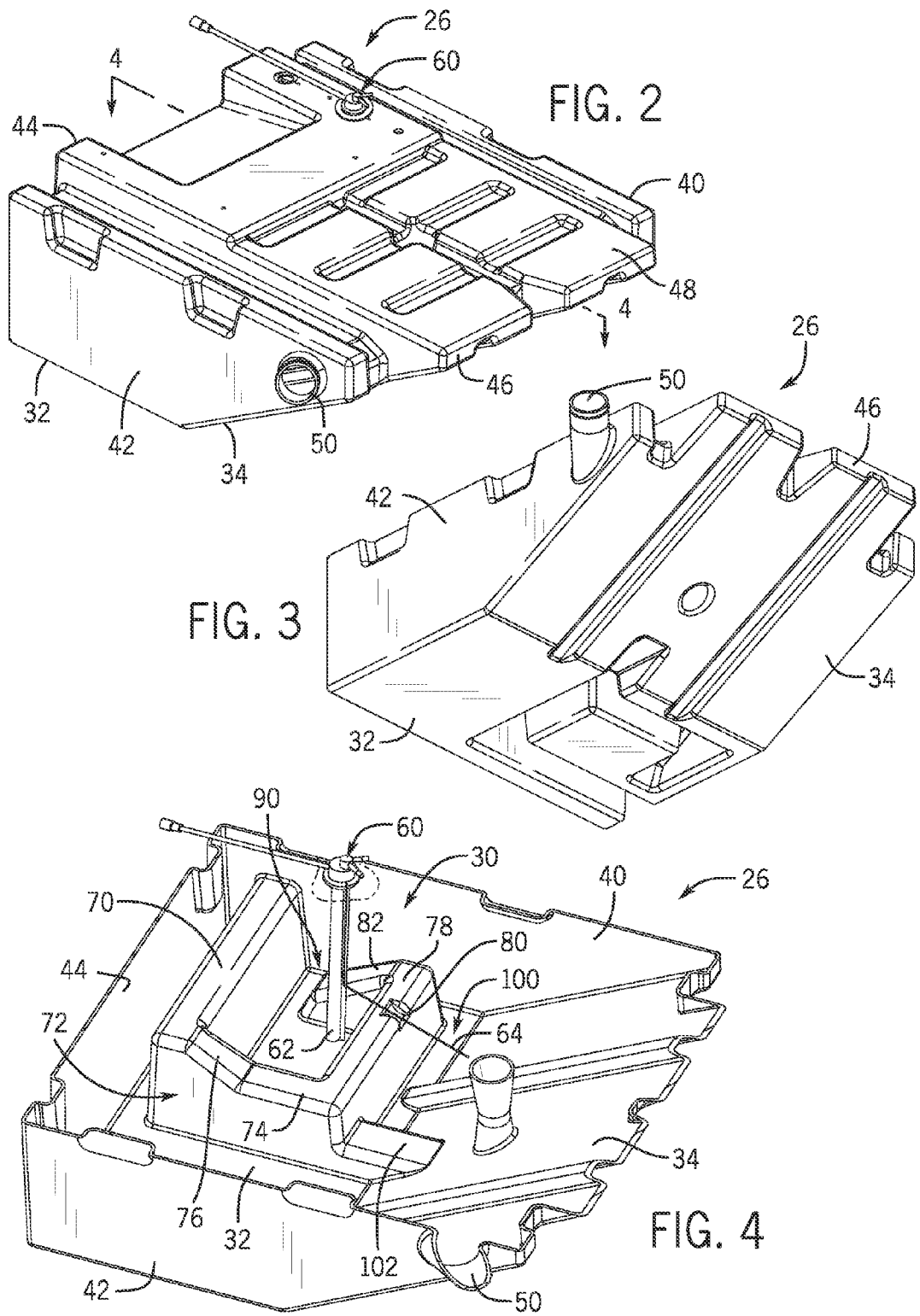

TANK WITH INVERTED SUMP

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates generally to liquid storage tanks, such as fuel tanks, for work vehicles.

BACKGROUND OF THE DISCLOSURE

Work vehicles, such as various construction, forestry and agricultural machines, often operate off-road on uneven terrain. This rough terrain may require the work vehicles to operate in one or more off-level (or off-axis) conditions. These off-level conditions include forward and rearward pitch orientations as well as side-to-side roll orientations. The fuel tank and fuel sender thus must be configured appropriately to maintain fuel delivery to the engine in such off-level conditions. Typically this is accomplished by terminating the fuel sender or pump in a fuel sump. Fuel sumps are often "bowls" or the like mounted below the main fuel tanks. The idea is that the bowl-shape of the fuel sumps will help contain and maintain a volume of fuel surrounding the fuel sender to keep the machine running when off-level. However, some sumps have limited volumes that are insufficient to maintain engine operation in more severe off-level conditions or for a sufficient runtime. Also, in some machines where it is vital to maintain a minimum ground clearance, fuel sumps extending beneath the fuel tank may be impermissible or subject to damage from impact with ground objects.

To avoid these issues, fuel tanks have been devised with "inverted" fuel sumps, in other words, fuel sumps that extend into the interior volume of the main fuel tanks, rather than below them. However, because of vehicle space constraints and the need to maintain a minimum ground clearance in some machines, the main fuel tank may have a low profile, and consequently the upright walls of conventional inverted fuel sumps may be too short to contain a sufficient volume of fuel for operation in certain off-level conditions or for a sufficient overall runtime. Various other factors (e.g., other interior space limitations) may further prevent a sump from providing sufficient fuel volumes for operation in certain off-level conditions.

SUMMARY OF THE DISCLOSURE

This disclosure provides a liquid storage tank for a work vehicle, for example an off-road vehicle requiring high ground clearance. The tank has an inverted sump within a tank volume defined between a tank floor and peripheral walls. For example, the tank may be a fuel tank, and the sump may be configured to store fuel within a sump volume sufficient to satisfy prescribed runtimes in various off-level conditions of the vehicle.

In one aspect, the disclosure provides a liquid storage tank for a work vehicle having a chassis supported by ground-engaging wheels or tracks. The tank includes a bottom wall extending in a lateral orientation spaced from the chassis, and upright peripheral walls at least in part surrounding the bottom wall and at least in part defining a tank volume. An inverted sump extends up from the bottom wall within the tank volume The sump is defined by at least three upright sump walls. At least one sump wall is spaced from at least one peripheral wall to define a flow passage extending from an area of the tank volume outside the sump to within the sump.

Another aspect of the disclosure pertains to a work vehicle having such a liquid storage tank, and in particular in which the liquid storage tank is a fuel tank. The fuel tank includes a bottom wall extending in a lateral orientation spaced from the vehicle chassis, and upright peripheral walls at least in part surrounding the bottom wall and at least in part defining a tank volume. An inverted sump extends up from the bottom wall within the tank volume. The sump is defined by at least three upright sump walls. At least one sump wall is spaced from at least one peripheral wall to define a flow passage extending from an area of the tank volume outside the sump to within the sump.

In still another aspect, the disclosure provides a fuel tank for a work vehicle having a chassis supported by ground-engaging wheels or tracks. The fuel tank includes a bottom wall extending in a lateral orientation spaced from the chassis, and upright peripheral walls at least in part surrounding the bottom wall and at least in part defining a tank volume. An inverted sump extends up from the bottom wall within the tank volume. The sump may be defined by four or more upright sump walls. A first sump wall extends from one peripheral wall into the tank volume at a first height. A second sump wall extends from the first sump wall spaced from the peripheral walls. The second sump wall at least in part has a second height lesser than the first height. A third sump wall extends from the second sump wall spaced from the first sump wall. The third sump wall has a third height equal to the second height. A fourth sump wall extends from the third sump wall spaced from the second sump wall. The fourth sump wall at least in part has a fourth height less than the third height. The fourth sump wall is spaced from the first sump wall and the peripheral wall from which the first sump wall extends. A flow passage is defined by the spacing between the fourth sump wall, the first sump wall and the peripheral wall from which the first sump wall extends.

In still another aspect, the liquid or fuel storage tank can have a supplemental sump formed within the tank volume, that is a supplemental inverted sump. For example, the tank bottom can include an inclined wall extending from the bottom wall of the sump. A spanner wall can extend between at least one sump wall and the inclined wall. The spanner wall can have a height less than one or more of the sump walls. The spanner wall can be located within the tank volume at a side of the fourth sump wall opposite the flow passage. Thus, the supplemental sump can be in direct communication with the flow passage.

The details of one or more implementations are set forth in the accompanying drawings and the description below. Other features and advantages will become apparent from the description, the drawings, and the claims.

BRIEF DESCRIPTION OF THE DRAWINGS

FIG. 2 is a perspective view of an example fuel tank with an inverted fuel sump;

FIG. 3 is another perspective view of the fuel tank of FIG. 2;

FIG. 4 is a sectional perspective view of the fuel tank of FIG. 2 showing the interior tank volume and inverted fuel sump;

Like reference symbols in the various drawings indicate like elements.

DETAILED DESCRIPTION

Figure 1:
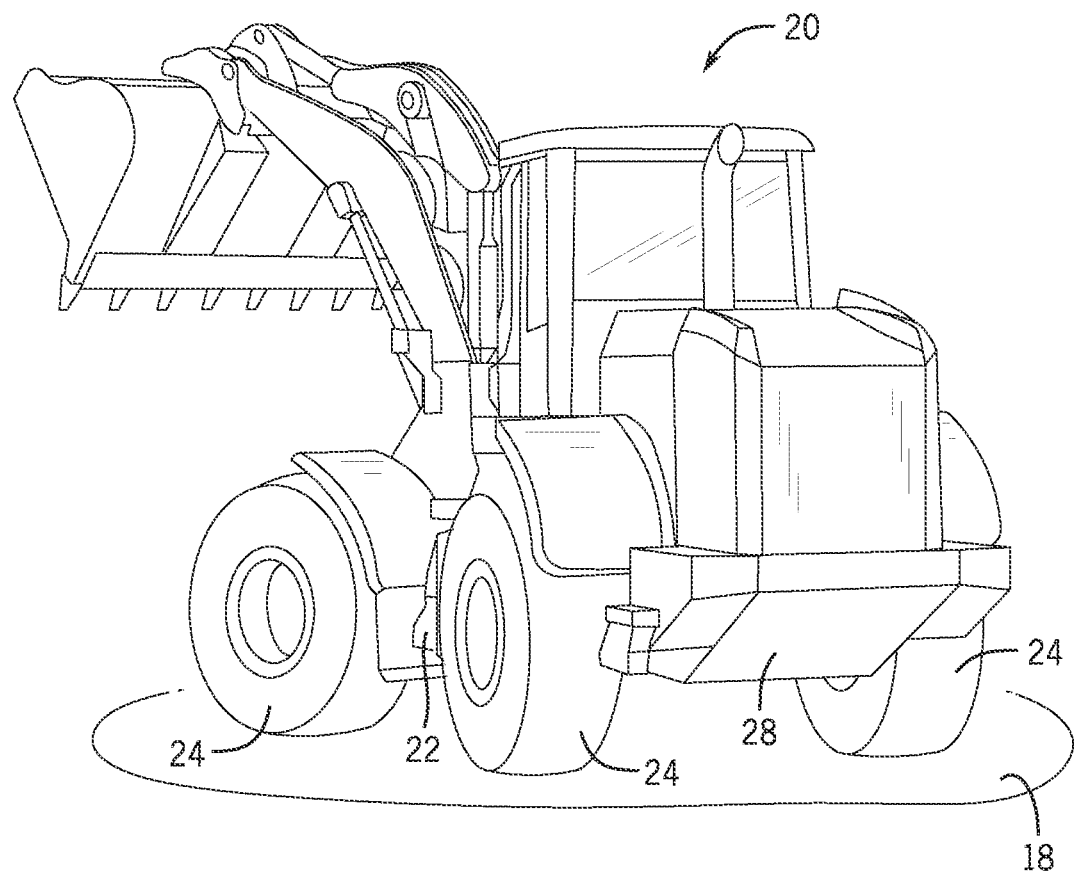
FIG. 1 is a perspective view of an example work vehicle in the form of a wheeled loader having a fuel tank with an inverted fuel sump as disclosed herein.

The following describes one or more example embodiments of the disclosed liquid storage tank with an inverted sump, as shown in the accompanying figures of the drawings described briefly above. Various modifications to the example embodiments may be contemplated by one of ordinary skill in the art, and it should be understood that the disclosed tank may be used advantageously in a variety of settings and with a variety of vehicles. For example, while the tank is described below as a "fuel tank," it should be understood that it could be used to store other non-fuel liquid media.

This disclosure thus provides a liquid storage tank, such as a fuel tank, with an improved inverted sump configuration. As a fuel tank, the disclosed tank addresses certain problems associated with work vehicles that require a minimum ground clearance and operate on off-level terrain. Fuel delivery problems of certain conventional fuel tanks with regard to fuel being diverted such that there is insufficient fuel volume at the fuel sender, (e.g., insufficient fuel to sustain combustion in the engine, inaccurate fuel gauge readings, fuel sender damage from high temperature return fuel, etc.) are corrected or alleviated.

More specifically, "inverting" the fuel sump helps maintain a high ground clearance. The terms "inverted" or "inverting" should be understood to refer to the sump extending or residing within the main tank volume defined between the bottom of the tank and its upright walls. Thus, an inverted fuel sump contrasts with a conventional (or non-inverted) sump, which may be of a configuration that extends downwardly from the bottom of the fuel tank. Such conventional sumps may take the form of a pan or bowl augmented to the bottom of the fuel tank, or they may be a downward depression formed in the bottom of the fuel tank. By residing within the main tank volume, that is above the bottom of the fuel tank, the bottom of the fuel tank can be located at or very near the height corresponding to the minimum ground clearance of the vehicle. This reduces the space envelope of the fuel tank, and increases the available space in the vehicle for mounting other components. It also reduces or eliminates the chance of damaging the fuel sump, since it is confined within the walls of the fuel tank rather than extending down toward the ground. This in turn improves the overall robustness and reliability of the fuel system.

Moreover, the disclosed refinements to the configuration of the inverted sump enhance operation of the fuel delivery system in one or more of the primary off-level conditions. For example, the disclosed fuel sump improves operation in certain prescribed fore and aft pitch orientations as well as certain left and right roll orientations. As used herein, the "pitch" of a vehicle may refer to a rotation of the vehicle about an axis extending along a lateral fore-aft centerline of the vehicle, as would correspond to inclination or declination of the vehicle in the forward and reverse directions of travel, or the fore and aft of the vehicle when stationary. The "roll" of a vehicle corresponds to side-to-side vehicle rotation about a longitudinal centerline of the vehicle. For example, it may be desired to maintain a certain volume of fuel in the fuel sump for operation of the vehicle through a 60 degree pitch range and a 30 degree roll range, that is +/−30 degrees in each of the fore and aft pitch orientations and +/−15 degrees in the each of the left and right roll orientations. Further, in certain vehicles it may be desired to maintain a sufficient fuel volume in the fuel sump during off-level orientations, such as the aforementioned pitch and roll orientations, to sustain a prescribed engine runtime, such as 5 minutes. The configuration of the disclosed inverted fuel sump allows the disclosed fuel tank to meet certain runtimes in all four primary off-level orientations.

Furthermore, work vehicles may be required, or expected, to meet certain overall runtimes per fuel up, that is the amount of time the engine can run continuously on one tank of fuel. The fuel tank and inverted fuel sump are configured so that the fuel sump occupies a relatively small volume of the tank volume as needed to maintain the off-level runtimes, and while allowing enough remaining tank volume to store sufficient fuel to satisfy the overall runtime requirements or expectations. For example, the fuel storage capacity of the disclosed fuel tank is sufficient to provide 12-hour runtimes for conventional diesel engine powered work machines operating under normal conditions and on level terrain.

In certain configurations, the fuel tank may have a bottom wall that extends in a lateral orientation spaced from the chassis. It should be understood that a "lateral" orientation refers generally to the extension in any fore-aft and/or side-to-side direction, such as parallel to a plane encompassing the fore-aft and side-to-side dimensions of the vehicle chassis. The fuel tank may further include upright peripheral walls at least in part surrounding the bottom wall and at least in part defining a tank volume. The fuel tank may also include the inverted sump extending up from the bottom wall within the tank volume. The fuel sump may be defined by at least three upright sump walls. At least one sump wall may be spaced from at least one peripheral wall to define a flow passage extending from an area of the tank volume outside the sump to within the sump.

In certain other configurations, the fuel tank may include an internal area that in effect forms a supplemental inverted sump, which aids in retaining and feeding a volume of fuel to the main fuel sump. For example, the fuel tank may have an inclined wall extending from the bottom wall. A spanner wall may extend between at least one sump wall and the inclined wall. The spanner wall may have a height less than at least one sump wall. Further, the bottom wall may define a bottom of the sump and a bottom of the flow passage. The inclined wall may define an obtuse included angle (i.e., between 90 and 180 degrees) with the bottom wall, which may be generally parallel to a level plane of the chassis or overall vehicle.

In still other configurations, the fuel sump may have three or more upright sump walls. For example, the sump walls may include a first sump wall extending from one peripheral wall into the tank volume at a first height. The sump walls may also include a second sump wall extending from the first sump wall spaced from the peripheral walls. The second sump wall may include a constant-height portion that has a second height lesser than the first height. The second sump wall may also include a transition portion that extends between the first sump wall and the constant-height portion of the second sump wall, which has a varying height sloping from the first height to the second height. The sump walls may also include a third sump wall extending from an end of the second sump wall spaced from the first sump wall. The third sump wall may have a third height equal to the second height. The sump walls may further include a fourth sump wall extending from an end of the third sump wall spaced from the second sump wall. The fourth sump wall may have a varying height sloping from the third height to a fourth height less than the third height. The fourth sump wall may be spaced from the first sump wall and the peripheral wall from which the first sump wall extends. Furthermore, the flow passage may be defined at least in part by the spacing between the fourth sump wall, the first sump wall and the peripheral wall from which the first sump wall extends. The spanner wall may have a height less than the second height and be located within the tank volume at a side of the fourth sump wall opposite the flow passage.

An example of the disclosed liquid storage tank, in the from of a fuel tank, will now be described with reference to the figures of the drawings. Specifically, FIG. 1 shows an example work vehicle 20 depicted as a wheeled loader, however various other vehicles, including off-road construction, forestry and agriculture machines, are contemplated. The vehicle 20 may include a chassis 22 supported by a plurality of wheels 24, or by one or more tracks (not shown). The chassis 22 and wheels 24 are arranged to create a high clearance between the ground 18 and the undercarriage of the vehicle 20. The chassis 22 supports a vehicle engine (not shown), various electrical and hydraulic sub-systems (not shown), as well as a fuel tank 26. These components are mounted to the chassis 22, or other components, so as to main the desired ground clearance. An underbody panel 28 may be configured and mounted to the chassis 22 to protect the fuel tank 26 from impact by debris and exposure to the elements. The underbody panel 28 may follow the contour of the underside of the tank 26 and be mounted in close proximity to the tank 26 to maximize ground clearance. It will be appreciated that, although tank 26 is depicted at a rear of the vehicle 20 in FIG. 1, the tank 26 may be disposed at other locations, for example, at a front end, in which case, the orientation of the fuel tank 26 may be reversed.

Turning now to FIGS. 2-5, the fuel tank 26 may be a molded, unitary structure, as best seen by comparison of FIGS. 3-4, having a single-ply wall construction in which indentions formed in the exterior (as shown in FIG. 3) form corresponding protrusions in the interior of the fuel tank 26 (as shown in FIG. 4). As one non-limiting example, the fuel tank 26 may be molded from a high-density polyethylene plastic or molding resin. One of ordinary skill in the art will appreciate that other choices of materials and manufacturing methods (e.g., welding a plurality of fabricated sheet steel elements together) are possible. In the illustrated example, the fuel tank 26 has a fuel sump 30 formed as a molded, unitary part of the tank bottom.

The example fuel tank 26 has a tank floor formed of a bottom wall 32 and an inclined wall 34. The bottom wall 32 may be a generally level portion of the tank floor and extend in a lateral orientation spaced from the chassis 22. The inclined wall 34 may extend from the bottom wall 32 toward the chassis 22, thereby providing a tapered exterior profile of the fuel tank 26, which among other things, helps with ground clearance and to deflect ground and other external objects. Furthermore, the tank floor may be configured of a complementary size and shape to the underbody panel 28.

The fuel tank 26 may also include a plurality of peripheral sidewalls extending upright from the edges of the bottom wall 32 and inclined wall 34 at a periphery of the fuel tank 26. The peripheral sidewalls may include first 40 and second 42 sidewalls, which may extend along the long side of the fuel tank 26, may be substantially parallel to one another, and may be substantial mirror images of one another. The peripheral sidewalls also may include third 44 and fourth 46 sidewalls, which may be generally perpendicular to the first 40 and second 42 sidewalls, and may span the short distance of the fuel tank 26 between the first 40 and second 42 sidewalls. The top edges of the sidewalls 40, 42, 44, 46 join with a top wall 48. The bottom wall 32, inclined wall 34, sidewalls 40, 42, 44, 46 and top wall 48 define an interior space including a tank volume in which fuel may be stored. By way of example only, the fuel storage capacity of certain modern wheel loader construction vehicles may be about 60 to 70 gallons. This volume has been determined to provide conventional diesel engines used in work vehicles, such as wheeled loaders, with at least about 12 hours of runtime under normal operating conditions. As noted, the fuel sump 30 is contained within the tank volume.

Figure 5:
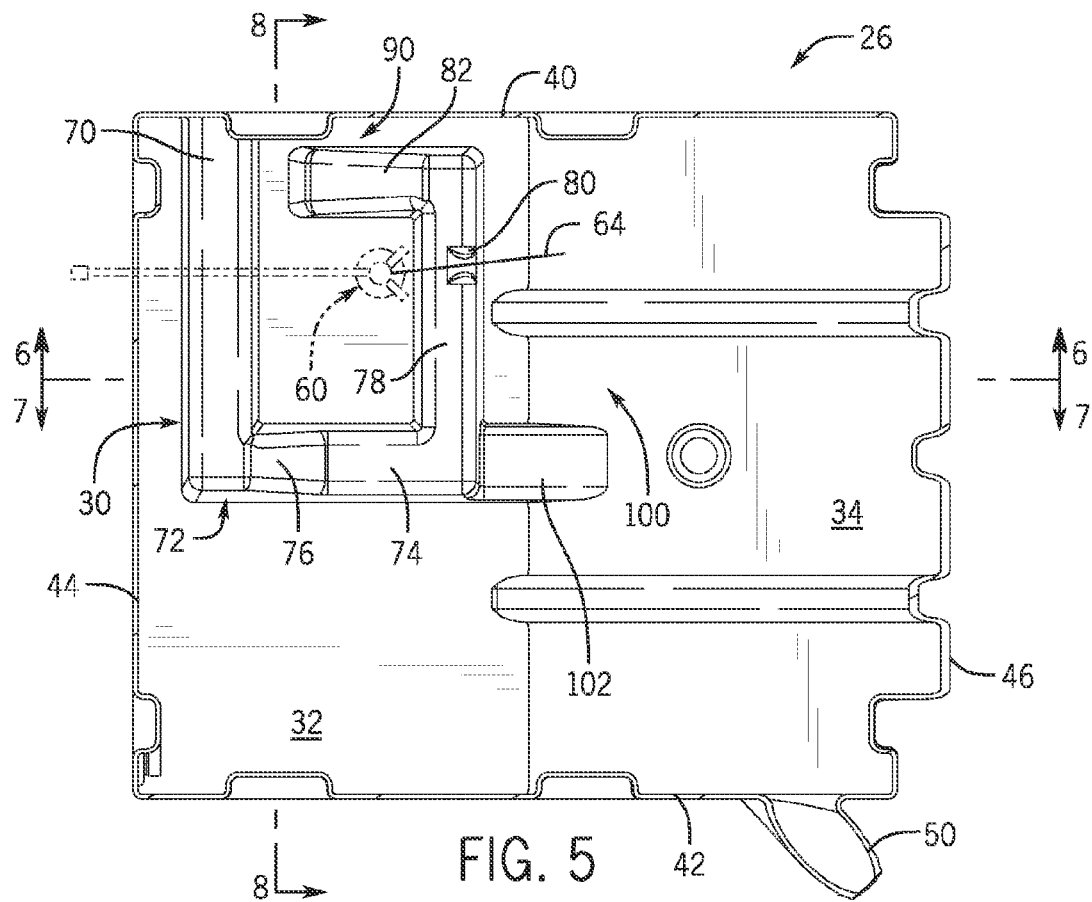
FIG. 5 is a top view thereof.
Figure 6:
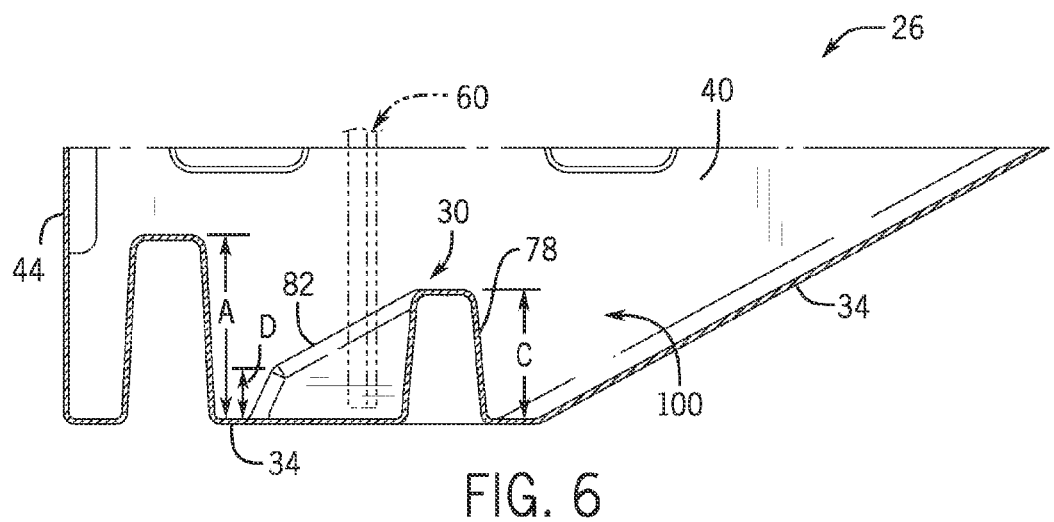
FIG. 6 is a side sectional view taken along line 6-6 of FIG. 5.
Figure 7:
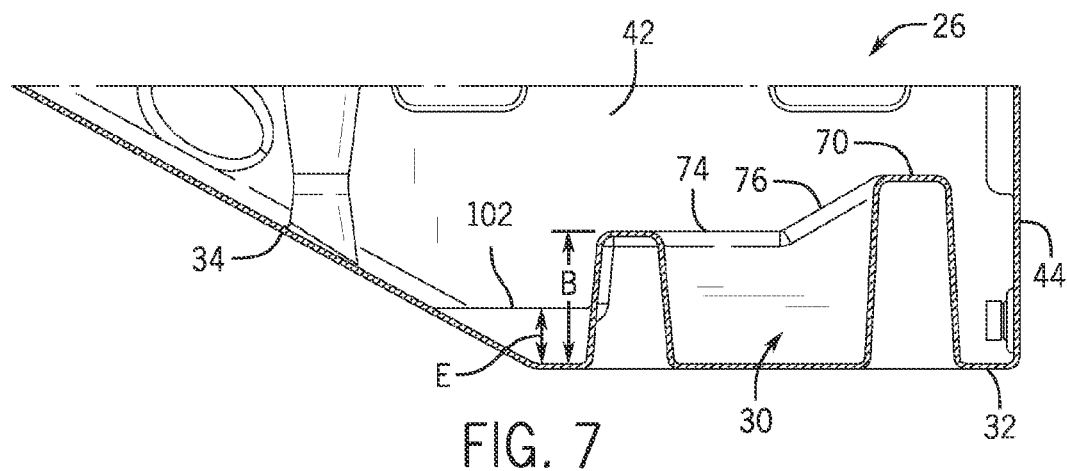
FIG. 7 is another side sectional view taken along line 7-7 of FIG. 5.
Figure 8:
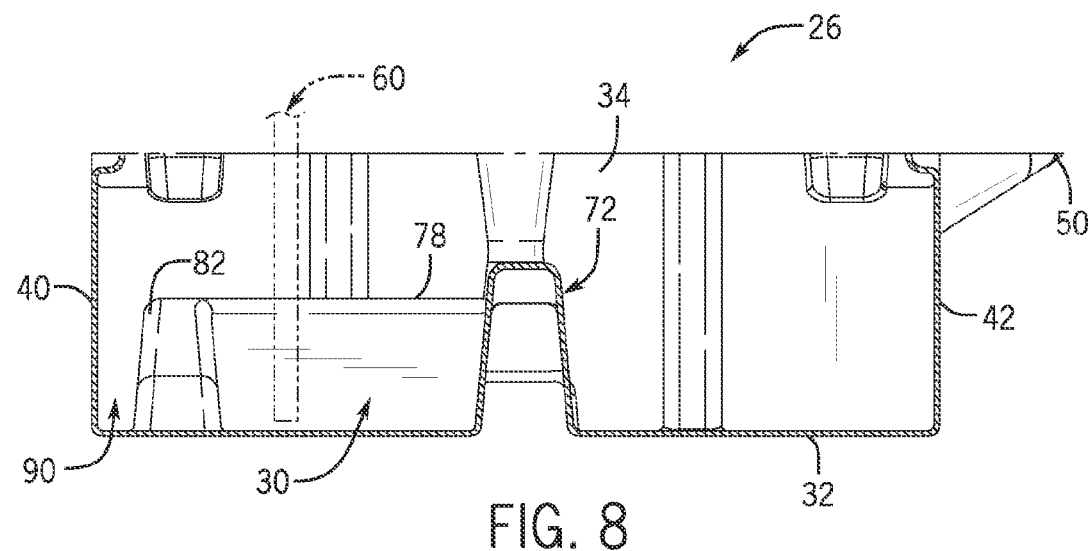
FIG. 8 is another side sectional view taken along line 8-8 of FIG. 5.

The fuel tank 26 may also include a fuel tank fill inlet, such as fuel tank fill inlet 50, proximate an upper edge of the second sidewall 42. As seen in FIGS. 4-5, the fuel tank fill inlet 50 may be spaced so as to maximize the distance between the fuel tank fill inlet 50 and the fuel sump 30. In one aspect, the fuel tank fill inlet 50 may be disposed proximate an upper, rearmost corner of the second sidewall 42, while the fuel sump 30 may be disposed proximate the opposite forwardmost corner of the fuel tank 26. Other configurations are possible as well (e.g., the fuel tank fill inlet 50 and the fuel sump 30 may be disposed proximate the same sidewall). In any event, the fuel tank fill inlet 50 may be located proximate the top of the fuel tank 26, and the fuel sump 30 may be disposed along, and includes a portion of, the bottom wall 32.

The fuel tank 26 may include a fuel column 60 extending downward through, and mounted to, the top wall 48 of the fuel tank 26 to a position proximate the bottom wall 32 and within the fuel sump 30. The fuel column 60 may include a fuel pickup 62 extending along the fuel column 60 and configured to deliver fuel from within the fuel tank 26 to the engine of the vehicle 20, as is understood in the art. The fuel column 60 also may include a fuel return line 64, which may branch off of, and deviate from, the fuel column 60 at a point along the fuel column 60. For example, the return line 64 may deviate at an intermediate location up the fuel column 60 (i.e., with respect to the distance between top wall 48 and the bottom wall 32), and in one example may deviate about halfway up the fuel column 60.

As noted, the fuel column 60 may be disposed at a location overlying the fuel sump 30, such that the fuel pickup 62 may be disposed within the fuel sump 30. The fuel return line 64 may terminate at a position external to, and laterally spaced from, the fuel sump 30, such as in a supplemental sump area (described below). The end of the fuel return line 64 may be disposed proximate the inclined wall 34, which may permit returned fuel to be introduced at a location surrounded by existing fuel in the fuel tank 26 even when fuel levels are approaching empty. Returned fuel may be significantly hotter than the stored fuel in the fuel tank 26, and spacing the end of the fuel return line 56 from the fuel pickup 62 allows the returned fuel to mix with the cooler stored fuel, thereby cooling the returned fuel, before it is retrieved again by the fuel pickup 62.

As mentioned, the example fuel tank 26 includes the inverted fuel sump 30 extending upward from the bottom wall 32. Thus, the floor of the fuel sump 30 is defined by a portion of the bottom wall 32. The height of the fuel sump 30 is defined by a plurality of connected upright sump walls extending toward, but spaced from, the top wall 48. The fuel sump 30 may include three or more upright sump walls, and in the illustrated example, the fuel sump 30 includes four upright sump walls. Again, the fuel sump 30 is considered to be "inverted" in that it resides within the tank volume of the fuel tank 26, rather than protruding down below the tank floor.

The sump walls each may include a sump-facing side and a tank-facing side facing away from fuel sump 30. One or both of the sump-facing and tank-facing sides may be perpendicular to the bottom wall 32. In the illustrated example, the sump-facing and tank-facing sides are angled slightly relative to the bottom wall 32 such that the sump walls are wider at their bases than at their tops. The sump walls are shorter than the peripheral sidewalls 40, 42, 44, 46, thereby permitting fluid to enter the fuel sump by flowing over the top of the sump wall, when the fuel tank 26 is at or near full capacity. The tops of the sump walls may be of the same height and parallel to the bottom wall 32, and thus level when the vehicle 20 is on level ground. However, as seen in FIGS. 4-8, the sump walls may vary in height and configuration. For example, the sump walls may form a continuous body commencing at one of the peripheral sidewalls 40, 42, 44, 46 and progressing in a clockwise or counterclockwise direction (when viewed from the perspective of FIG. 5), with each successive sump wall having a portion of its top that is shorter than a portion of the top of the preceding sump wall.

The configuration of the illustrated example fuel sump 30 will now be described with reference to FIGS. 4-8. Specifically, a first sump wall 70 extends into the interior tank volume of the fuel tank 26 from a peripheral sidewall, such as sidewall 40, in a lateral direction of the fuel tank 26. The first sump wall 70 may be substantially perpendicular to the sidewall 40, as seen in FIG. 5, although it is possible for the first sump wall 70 to be disposed at a somewhat acute or obtuse angle relative to the peripheral sidewall 40. The first sump wall 70 is a constant-height wall, extending to a first height "A" (see FIG. 6) relative to the bottom wall 32.

A second sump wall 72 extends from the inner end of the first sump wall 70, substantially perpendicular to the first sump wall 70 and parallel to the peripheral sidewall 40. The second sump wall 72 has a varied height. A segment 74 of the second sump wall 72 extends to a height "B" (see FIG. 7), which is less than height A of the first sump wall 70, and an angled segment 76 transitions between the top of the first sump wall 70 and the top of the segment 74. More specifically, the angled segment 76 of the second sump wall 72 extends from the sump-facing side of the first sump wall 70 and extends about half the distance of the second sump wall 72. Segment 74 extends from the end of the angled segment 76 to a third sump wall 78.

The third sump wall 78 extends substantially perpendicularly from the second sump wall 72, and substantially parallel to, and spaced from, the first sump wall 70. The third sump wall 78 extends in a direction from second sump wall 72 back toward peripheral sidewall 40, although the third sump wall 78 has a length less than that of the first sump wall 70, such that the third sump wall 78 does not intersect with sidewall 40. The third sump wall 78 is generally a constant height, extending at a third height "C" (see FIG. 6) that is equal to height B of segment 74 of the second sump wall 72. The top of the third sump wall 78 may also include a notch 80, which may receive a portion of the fuel return line 64 to secure the fuel return line 64 to terminate close to the inclined wall 34.

The end of the third sump wall 78 intersects a fourth sump wall 82, which is generally parallel to, and spaced from, the second sump wall 72, and substantially perpendicular to the third sump wall 78. The fourth sump wall 82 extends in a direction from the third sump wall 78 back toward the first sump wall 70, although the fourth sump wall 82 has a length less than that of the third sump wall 78, such that the fourth sump wall 82 does not intersect with first sump wall 70. The fourth sump wall 82 is angled, declining form the third sump wall 78, at height C, to a height "D" (see FIG. 6) less than the height C.

As noted, the fourth sump wall 82 is spaced from first sump wall 70, and both the third 78 and fourth 82 sump walls are spaced from the peripheral sidewall 40 from which the first sump wall 70 extends. The spacing between the peripheral sidewall 40 and the first 70, third 78 and fourth 82 sump walls forms a flow passage 90, which is generally L-shaped in the illustrated example, for fuel to flow into and out of the fuel sump 30 from the remainder of fuel tank 26. The fuel pickup 62 is located in the interior corner formed by the intersection of the third 78 and fourth 82 sump walls. The return fuel line notch 80 is located generally the same distance from peripheral sidewall 40 as the fuel pickup 62.

Returning to FIGS. 4-5, in still another aspect, the fuel tank 26 may include a type of supplemental fuel sump 100 formed outside of the periphery of the fuel sump 30, but within the remainder of the tank volume. The supplemental fuel sump 100 may be formed in part by a spanner wall 102 that extends from the tank-facing side of the second 72 and/or third 78 sump walls in the long direction of the fuel tank 26 generally in-line with the second sump wall 72. The spanner wall 102 may extend along at least a part of the bottom wall 32 and intersect the inclined wall 34. The spanner wall 102 may have a height more or less than one or more of the sump walls 70, 72, 78, 82. In the illustrated example, the spanner wall 102 extends to a height "E" (see FIG. 7) less than the height C of the third sump wall 78, but slightly higher than the height D of the fourth sump wall 82. The spanner wall 102 is located within the tank volume to the tank-facing side of the third sump wall 78, but in communication with, the flow passage 90. Thus, the supplemental fuel sump 100 is defined by the space between the third sump wall 78, the spanner wall 102, the inclined wall 34 and the peripheral sidewall 40, and is in direct communication with the flow passage 90. Like the fuel sump 30, the supplemental fuel sump 100 may also be considered to be an "inverted" sump, since it too extends inside the tank volume above the tank floor. Among other things, the supplemental fuel sump 100 facilitates providing a fuel volume for the fuel sump 30 in low-fill tank conditions.

Figure 9:
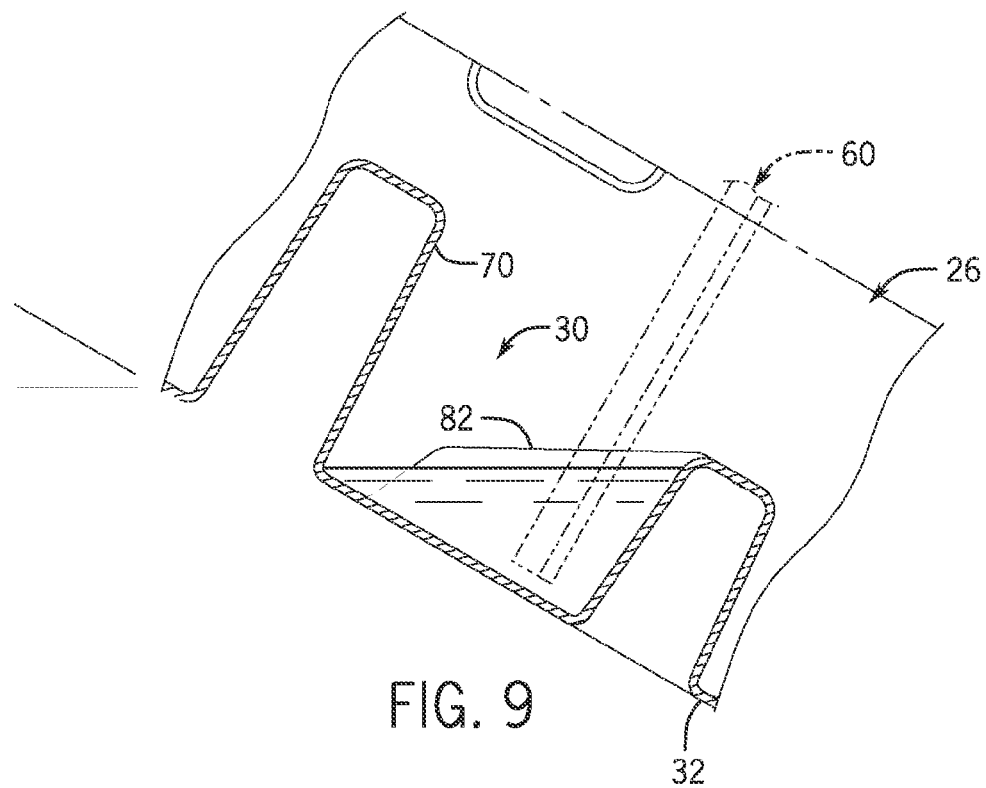
FIGS. 9-12 are partial sectional views showing the tank in various off-level orientations.
Figure 10:
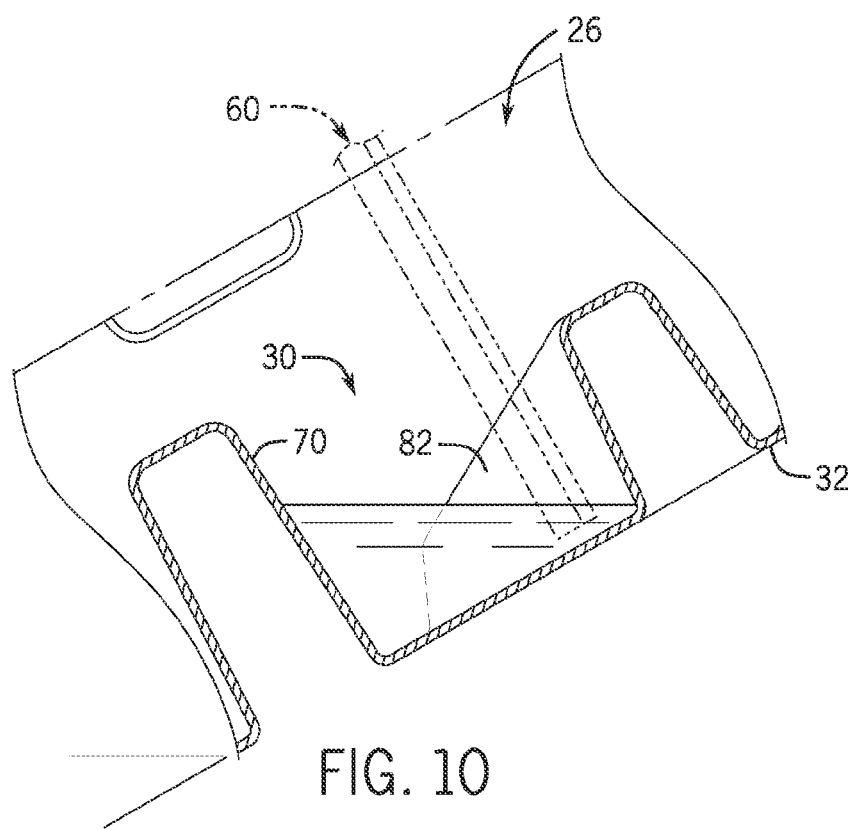
Figure 11:
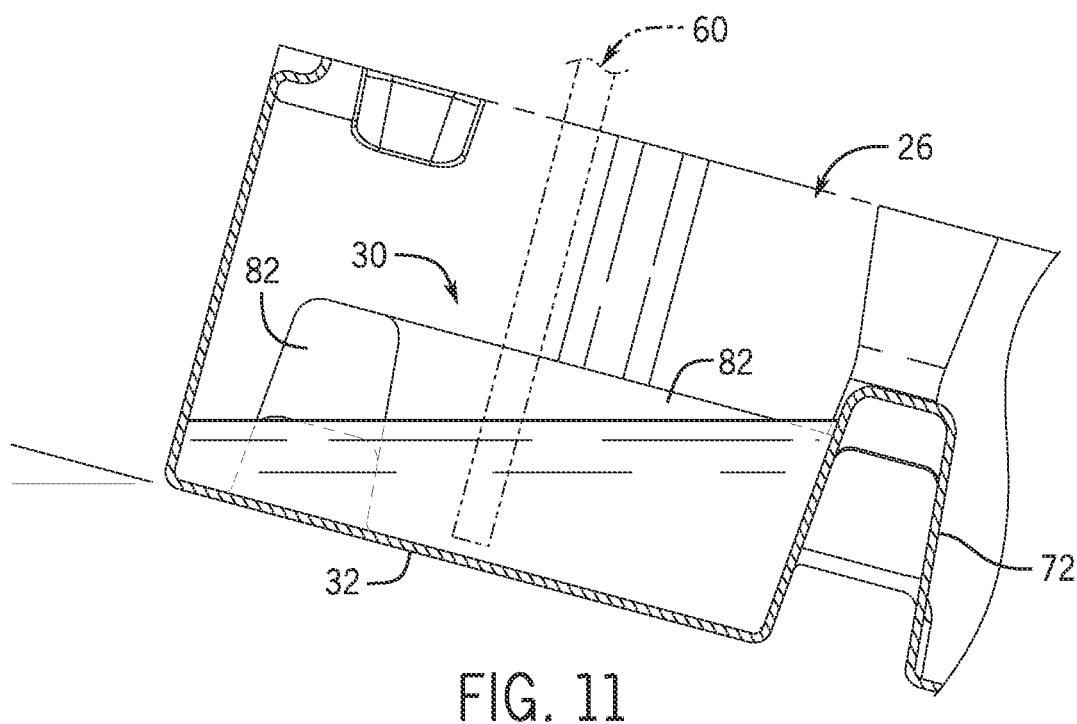
Figure 12:
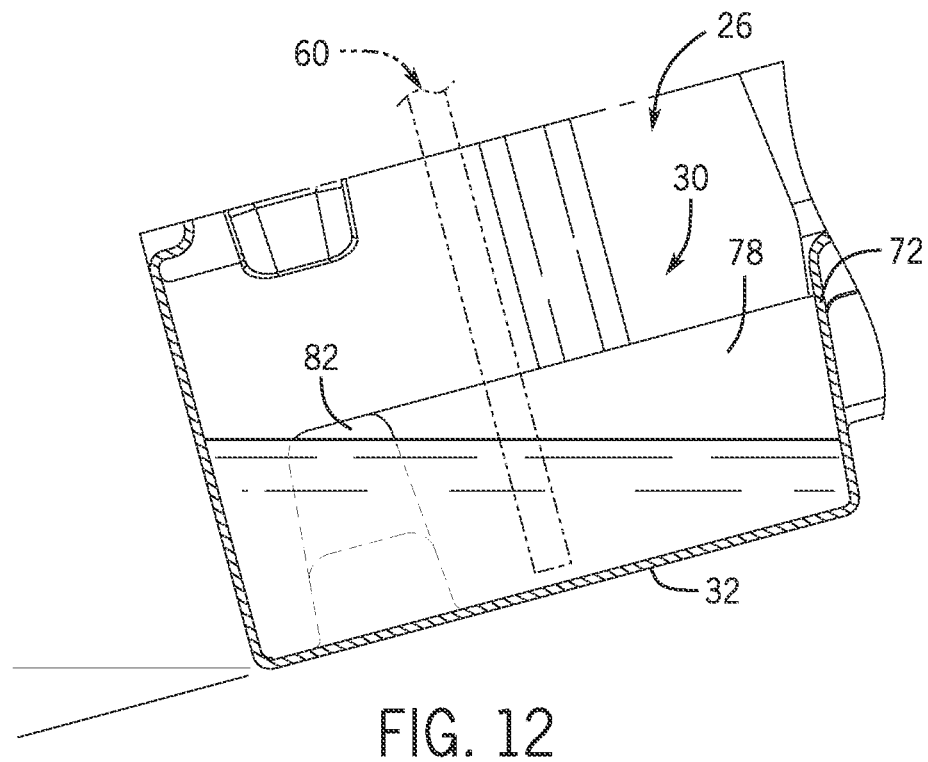

Turning now to FIGS. 9-12, the fuel sump 30 may be configured to store fuel within a sump volume sufficient to satisfy prescribed runtimes in various off-level or off-axis conditions of the vehicle 20, while at the same time occupying limited tank volume such that the fuel tank can meet overall per-fill engine runtime requirements or expectations. By way of example, the illustrated example allows the fuel tank 26 to have a sufficient capacity to provide or exceed 12-hour runtimes in normal operating conditions, and level orientations. The fuel sump 30 can further contain a fuel volume sufficient to provide a 5-minute runtime in each of four primary off-level or off-axis orientations, including about 30 degree (incline and decline) pitch orientations, as seen in FIGS. 9-10, and about 15 degree (left side and right side) roll orientations, as seen in FIGS. 11-12.

To further specify the details of a single example fuel tank having the noted fuel capacity, the fuel tank 26 and inverted fuel sump 30 may have the following dimensional attributes. Specifically, the fuel tank may be about 1150 mm long overall. Of this length, the bottom wall 32 may be about 525 mm long, and the inclined wall 34 may be about 625 mm long. The fuel tank 26 also may be about 900 mm wide and about 400 mm tall.

For a fuel tank with these dimensions, the first sump wall 70 may be about 208 mm high and about 412 mm long at its base. The angled segment 76 of the second sump wall 72 may decline about 30 degrees over about a 100 mm length, and the flat segment 74 may have a height of about 142 mm and about 125 mm to the sump-facing side of the third sump wall 78. The third sump wall 78 may have a height similar to the height of the flat segment 74 of the second sump wall 72. The sump-facing side of the third sump wall 78 may be spaced between about 435 mm from the peripheral side wall 44. The fourth sump wall 82 may decline at an angle similar to angled segment 76 of the second sump wall 72, and have a length from the sump-facing side of the third sump wall 78 of about 170 mm. The flow passage 90 may have a width at its base between the fourth sump wall 82 and the peripheral sidewall 40, and between the first sump wall 70 and the fourth sump wall 82, of about 45 mm.

Described in another way, the first sump wall 78 may have a height that is about 53% of the total height of the fuel tank 26. The third sump wall 78 and the flat segment 74 of the second sump wall 72 may have a height that is about 36% of the total height of the fuel tank 26, and about 68% of the height of the first sump wall 70. Moreover, the first sump wall 70 may have a tank-facing side length that is about 57% of total tank width (short dimension). The second sump wall 72 may have a tank-facing side length that is about 62% of that of the first sump wall 70, and the third sump wall 78 may have a tank-facing side length that about 91% of the first sump wall 70. The flow passage 90 may have a width that is about 5% of the width (short dimension) of the fuel tank 26.

The terminology used herein is for the purpose of describing particular embodiments only and is not intended to be limiting of the disclosure. For example, the terms "upper," "lower," and the like may be used with respect to the relative orientation of a particular embodiment, but may not be intended to limit the disclosure to that orientation or embodiment. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A liquid storage tank for a work vehicle having a chassis supported by ground-engaging wheels or tracks, the tank comprising:
    a bottom wall extending in a lateral orientation spaced from the chassis;
    upright peripheral walls at least in part surrounding the bottom wall and at least in part defining a tank volume; and
    an inverted sump extending up from the bottom wall within the tank volume, the sump defined by at least three upright sump walls, at least one sump wall being spaced from at least one peripheral wall to define a flow passage extending from an area of the tank volume outside the sump to within the sump, wherein the sump walls include a first sump wall extending into the tank volume at a first height and a second sump wall extending from the first sump wall at least in part at a second height that is less than the first height;
    wherein the second sump wall includes a constant-height portion at the second height and a transition portion that extends between the first sump wall and the constant-height portion and that has a varying height sloping from the first height to the second height.

2. The tank of claim 1, wherein the bottom wall defines a bottom of the sump and a bottom of the flow passage.

3. The tank of claim 1, further including an inclined wall extending from the bottom wall and defining therewith an angle less than 180 degrees.

4. The tank of claim 3, wherein the angle is obtuse.

5. The tank of claim 3, further including a spanner wall extending between at least one sump wall and the inclined wall.

6. The tank of claim 5, wherein the spanner wall has a lesser height than at least one sump wall.

7. The tank of claim 1, wherein the first sump wall extends from one peripheral wall.

8. The tank of claim 7, wherein the second sump wall is spaced from the peripheral walls.

9. The tank of claim 1, wherein the sump walls include a third sump wall extending from an end of the second sump wall spaced from the first sump wall.

10. The tank of claim 9, wherein the third sump wall has a third height equal to the second height.

11. The tank of claim 10, wherein the sump walls include a fourth sump wall extending from an end of the third sump wall spaced from the second sump wall.

12. The tank of claim 11, wherein the fourth sump wall has a varying height sloping from the third height to a fourth height less than the third height.

13. The tank of claim 12, wherein the fourth sump wall is spaced from the first sump wall and the peripheral wall from which the first sump wall extends, and wherein the flow passage is defined at least in part by the spacing between the fourth sump wall, the first sump wall and the peripheral wall from which the first sump wall extends.

14. The tank of claim 13, further including:
    an inclined wall extending from the bottom wall; and
    a spanner wall extending between at least one sump wall and the inclined wall;
    wherein the spanner wall has a height less than the second height and is located within the tank volume at a side of the fourth sump wall opposite the flow passage.

15. The tank of claim 14, wherein the spanner wall has a height less than the second height.

16. A work vehicle having a chassis supported by ground-engaging wheels or tracks, the work vehicle comprising:
a fuel tank including:
a bottom wall extending in a lateral orientation spaced from the chassis;
upright peripheral walls at least in part surrounding the bottom wall and at least in part defining a tank volume;
an inverted sump extending up from the bottom wall within the tank volume, the sump defined by at least three upright sump walls, at least one sump wall being spaced from at least one peripheral wall to define a flow passage extending from an area of the tank volume outside the sump to within the sump, wherein the sump walls include a first sump wall extending into the tank volume at a first height and a second sump wall extending from the first sump wall at least in part at a second height that is less than the first height;
an inclined wall extending from the bottom wall; and
a spanner wall extending between at least one sump wall and the inclined wall.

17. A fuel tank for a work vehicle having a chassis supported by ground-engaging wheels or tracks, the fuel tank comprising:
a bottom wall extending in a lateral orientation spaced from the chassis;
upright peripheral walls at least in part surrounding the bottom wall and at least in part defining a tank volume; and
an inverted sump extending up from the bottom wall within the tank volume, the sump defined by upright sump walls including:
a first sump wall extending from one peripheral wall into the tank volume at a first height;
a second sump wall extending from the first sump wall spaced from the peripheral walls, the second sump wall at least in part having a second height lesser than the first height;
a third sump wall extending from the second sump wall spaced from the first sump wall, the third sump wall having a third height equal to the second height; and
a fourth sump wall extending from the third sump wall spaced from the second sump wall, the fourth sump wall at least in part having a fourth height less than the third height;
wherein the fourth sump wall is spaced from the first sump wall and the peripheral wall from which the first sump wall extends, and wherein a flow passage is defined by the spacing between the fourth sump wall, the first sump wall and the peripheral wall from which the first sump wall extends.

18. The fuel tank of claim 17, further including:
an inclined wall extending from the bottom wall; and
a spanner wall extending between at least one sump wall and the inclined wall;
wherein the spanner wall has a height less than the second height and is located within the tank volume at a side of the fourth sump wall opposite the flow passage.

\* \* \* \* \*